Patented Oct. 4, 1949

2,483,761

UNITED STATES PATENT OFFICE 2,483,761

FOOD PRODUCT

Henry M. Dux, Jacksonville, Fla.

No Drawing. Application December 3, 1948,
Serial No. 63,440

7 Claims. (Cl. 99—204)

This invention is to relate to a food compound for human consumption and method of production consisting of a blended combination of citrus fruit peel or rind, principally that of oranges and commercial dried raisins, having a novel flavor characteristic, marketed either in a dehydrated form coarse or powdered, or viscous consistency, in the powdered form with the addition of sugar for its reduction to a determined degree of fineness.

An object of the invention is to utilize the peel or rind of citrus fruit, particularly of oranges, termed as residue or waste resulting from the extraction of the juice from oranges in citrus fruit processing plants in large volume and representing approximately forty per cent or over the weight of the whole fruit, and after initially removing therefrom, in so far as is commercially practicable, the peel oil existing in the rind for producing a palatable and edible food product for human consumption and particularly as an ingredient in the production of foods, as an example for bakery and confection products, either domestic or commercial.

Another object is to provide a blended combination of citrus peel and raisins for the production of a product having a novel flavor for use as an ingredient in the production of food products for human consumption.

Another object is to provide a commodity as an ingredient for food products for human consumption consisting or a blended combination of orange peel and raisins, dehydrated and granulated or pulverized.

Another object is to provide a commodity as ingredient for food products for human consumption consisting of a compressively blended combination of citrus peel and raisins, with the peel at a temperature of 140° F. to 200° F.

Various other objects, features and advantages of the invention will be apparent from the following description.

This application is a continuation-in-part of an application filed by me September 13, 1945, Serial No. 616,145, and pending at the time of filing of this application, but which is now abandoned.

The use of citrus fruit peel or waste in the production of a cattle food and fertilizer is well recognized and its processing procedure generally includes the addition of chemicals and components which render it unsuitable for human consumption.

The constituents of orange peel, analytically have been given extensive consideration and are recognized as possessing many nutritional factors of value in the production of products for human consumption. Its combination with other food stuffs contributes very desirable characteristics, specifically in combination with wheat flour and other ingredients employed in the making of baked products, for its use as a filler or extended in equal or lesser percentage than that of flour, while in confections it may be the basic ingredient, in major percentages. Heretofore, however, it has always had an undesirable characteristic, that of producing a bitter or objectionable flavor, and efforts heretofore to process the same for removal of such disagreeable flavor have resulting in cost increases adverse to its extensive commercialization.

The present invention is directed to a properly conditioned mixture and blended combination of citrus peel particularly orange peel and raisins, having a novel flavor and which contains no artificial or synthetic ingredients for its commercialization in a fine powder form, the blended peel-raisin combination after dehydration is milled with an added small percentage of granulated sugar, for its reduction to a fine powder of 80 mesh or finer.

As a blended peel raisin powder it is high in sugars, as raisins contain over 60% natural fruit sugar and with the added sugar for pulverization in one form the powder contains about 40% sugars. The remaining components are raisin and peel carbohydrate, pectic and cellulose substances, along with many of the nutritional factors of the respective fruits. The processing excludes bitter and undesirable flavors common to ordinary citrus peel powders and also the elimination of objectionable citrus peel oil flavors.

The process for the production of the product can be effected in a continuous performance, to a dehydrated blended peel-raisin combination, particularly when utilizing the peel approximately immediately after the juice has been extracted from the fruit to free the peel therefrom and to avoid any opportunity for bacteria activation or contamination detrimental to the use of the peel.

As the elimination of objectionable citrus peel oil flavor is a factor, the peel preliminarily is subjected to the action of apparatus to express the oil therefrom and for a conventional type may comprise a conical screw rotative and housed within and longitudinally of a casing, receiving the peel therein at one end and discharging the same after the treatment from the opposite end. The oil is drained from the lower side of the casing as it is transmitted therethrough and until discharged from the casing. As the oil removing step is auxiliary it may however, be included and of benefit in reducing the treatment period in a successive or initial step.

The peel thence is deposited into the receiving end of a compartment or tank which may be termed a macerating and leaching chamber wherein it is advanced and subjected to a treatment, as submergingly in a heated water bath, at a boiling temperature or nominally at 212° F. for a period necessary to sterilize, remove remaining oil, etc. to heat and soften the same by infusion, for a determined length of time as from 2 to 20 minutes. The inclusion of steam in the macerating and leaching chamber is very effective for time reduction and combined with the continuous rinsing as by the flow of the water and conveyance of the peel at a temperature of approximately 212° F., the period can be reduced to approximately two minutes. Recognizing time and temperature are correlated factors, a reduction or increase in temperature relatively effects the time of treatment. The treatment primarily is to condition and heat the peel for an appropriate blending of the peel and raisins after the water or liquid has been expelled from the peel and to an extent or degree as results from passing the same progressively through a dewatering press. A conventional type of press being comparative to that described for peel de-oiling.

The period of time for maceration is variable. The de-oiling to an extent for oil recovery materially reduces the time that the peel be subjected to the leaching or macerating stage and further to leach out other components and constituents, or possible reduction of a bitter flavor of the peel, all being a governing factor as to a relative percentage or amount of raisins necessary to be included for a given amount of peel. That the proportion of raisins be as low as possible and for a blended dehydrated product be not in excess of an equal percentage to produce a novel flavor, differentiating from that of either of the two constituents and essentially free from a bitter citrus flavor, otherwise the raisin cost would be excessive.

Variation of the length of time for the macerating and leaching treatment of the peel also is due to the degree of ripeness of the fruit and of the type of fruit such as navel or Valencia oranges.

The maceration treatment of the peel has numerous qualifications as example, it sterilizes the peel, inactivates enzymes, releases and removes the bitter substances and neutralizes some of the flavor, removes substantially all of the remaining peel oil, softens the peel for readily compressively blending it with the raisins, cooks the albedo so that it is fully digestible for human consumption and converts the pectic substances to emulsifying and anti-staling substances.

It has been experienced that unless the peel is in a heated condition when intermixing the same with the raisins, the flavor of the peel and raisins remain prominently separate and that the blending should be effected at a temperature of 140° F. to 200° F.

The macerating and leaching chamber is preferably of an elongated cylindrical form, and interiorly for its length is provided with a conveyor, for continuously transporting the peel therethrough and submergingly through the hot water. The macerating and leaching time can thus be advantageously controlled by the length of the chamber and rate of feed, by the conveyor rotating speed and by the hot water draining counter to the travel of the peel.

In the discharge of the peel from the macerating and leaching chamber, it is quickly passed through a dewatering press, to remove the surplus from the peel, which has its receiving end in communication with the discharge end of the macerating and leaching chamber and correspondingly the discharged end of the dewatering press is in communication with a mixer and into which the raisins are also conducted. The mixer may comprise a chamber having a rotative arbor axially thereof, the arbor having a series of blades radially thereof and from the mixer the peel and raisins are fed into a masticator or grinding machine, which may be of a conventional type.

The operation of passing the peel from the leaching chamber through the dewatering press and thence with the raisins through the mixer is rapid with but a small loss in degree of tempertaure of the peel, so that the peel temperature immediately after the raisins are intermixed therewith is approximately between 140–175° F. The two ingredients for their masticating and blending treatment therefore are warm and of a similar degree of plasticity for perfect blending thereof to produce a new and novel flavor. This it has been experienced can only be accomplished when both ingredients are warm, moist and in a physical state for suitable compressive grinding and crushing of the same together.

A mixture from which a product possesses a distinctive and palatable flavor, with a nominal amount of raisins, as an economic factor, for example, proportions of about twenty (20) pounds of raisins to eighty (80) pounds of orange peel, the peel weight being with its normally contained moisture content, and which does not possess too great a bitterness in flavor. Such proportioning in a dehydrated product, will approximate about two parts of dry peel substance and one part of dry raisin substance.

The peel of different kinds and grades of citrus fruit such as in oranges, Valencia and navel, require relative variations as to the proportions of raisins, as one inherently possesses a more bitter flavor than the other and therefore may require a longer leaching treatment and a greater amount of raisins. Therefore a range of raisins may be from a low of 5% to a high of 25% of the combined weight of the peel and raisins before dehydration and on a dehydrated weight basis may extend from six parts of dehydrated peel substance for each part of dehydrated raisin substance to an equal part of each substance. Its production, however, must not require an extended treatment of the peel nor excessive quantity of raisins, resulting in added costs adverse to its commercialization and use in quantities justifying its production, nor as it has been experienced, is it acceptable to the trade if it possesses a bitter peel flavor.

A proportional range for a blended combination of peel and raisins on a dehydrated basis may be given, as peel 90% to 50% and raisins 10% to 50% of the net weight of the product and this for a dehydrated product exclusive of any sugar that may be added to govern its reduction to a desired degree of powder fineness.

The blended masticated combination, preferably in the particle form, is then dried or dehydrated, with the temperature and rate directed to avoid scorching. The dehydrating step may be accomplished in any suitable manner or preferred type of apparatus and the operation may be either continuous or batch. It has been practiced, to pass the comminuted mixture through a rotating cylinder surrounded by a heating jacket and provided internally with a suitable means for agitating and tumbling the mixture to prevent the same from adhering to the wall of the cylinder and to present various surfaces of the particles to the hot air passed through the cylinder.

For the production of a powdered product the dehydrated particles are passed through a pulverizing machine, suitable for the purpose, and which are commercially available, so that detail description thereof need not be made herein.

In conjunction with the pulverizing stage, sugar, dextrose or both or other crystalline sweetening ingredient is preferably preliminarily added, which has a faculty for better and quicker pulverizing and a better mixing of the materials. It has been experienced that it is of advantage that the pulverization be in stages where the product is to be in a finely powdered state, as for example, first to pulverize so as to pass through a 40 to 60 mesh screen, then following further pulverization to pass through a 100 or 120 mesh screen, as this avoids liability of excessively heating the material which adversely affects the taste of the finished product.

As a peel-raisin powder, aside from the qualities as herein before set forth as a bakery product, it has exceptional water absorbing qualities. The powder itself will absorb many times its own volume of water and still remain plastic and dough-like.

The drying of baked goods upon aging is retarded. Also aside from a moisture retention it has an anti-staling and flavor keeping factor. It also possesses emulsifying qualities to bring about a smooth and easy blending of flour with shortening and the usefulness of the emulsifying effect in bakery and candy making formulation appears to have numerous unique aspects.

Having described my invention, I claim:

1. A dehydrated food product having a novel flavor consisting of a composition of de-oiled orange peel and raisins, blended by a compressive and grinder action with the peel in a macerated moisture carrying and heated condition, the dehydrated composition containing one part of raisin substance and from one to six parts of peel substance.

2. A food product consisting of a composition of de-oiled orange peel and dry raisins and blended by a compressive and grinder action with the peel in a macerated and heated state, the peel and raisins relatively proportioned and combined to produce a composition having a novel flavor, the raisins of from 5% to 25% of the net total weight of the composition.

3. The method of producing a food product of a combination of de-oiled orange peel and dry raisins, combining and subjecting the same to a compressive and grinding action into a blended masticated composition possessing a novel flavor, the peel in the blending and masticating treatment being in a macerated condition and heated state.

4. The method of producing a food product of a combination of de-oiled orange peel and dry raisins, combining and subjecting the same to a compressive and grinding action into a blended masticated composition possessing a novel flavor, the peel in the blending and masticating treatment being in a macerated condition and heated state and thereafter dehydrating the composition.

5. The method of producing a food product consisting of orange peel and dry raisins, subjecting the peel after de-oilment to a heated water bath to macerate, leach and heat the same, thence after removal of the surplus water admix the raisins therewith, the peel in a proportion of from 95% to 75% and raisins from 5% to 25% of their combined weight and subjecting the combination while the peel is in a macerated and heated state to a compressive and grinding action into a blended masticated composition.

6. The method of producing a food product consisting of orange peel and dry raisins, subjecting the peel after de-oilment to a heated water bath to macerate, leach and heat the same, thence after removal of the surplus water admix the raisins therewith, the peel in a proportion of from 95% to 75% and raisins from 5% to 25% of their combined weight and subjecting the combination while the peel is in a macerated and heated state to a compressive and grinding action into a blended masticated composition, thence dehydrating the composition and pulverizing the same with the addition of sugar in a quantity sufficient to reduce the same to a determined degree of fineness.

7. The method of producing a dehydrated powder fruit product, having a novel flavor characteristic, which consists in blending and comminuting a mixture of macerated orange peel and raisins, in a proportion of approximately 80 percent peel to 20 percent raisins and rendering the compositions into shreds, then dehydrating the shredded composition and pulverizing the dehydrated product.

HENRY M. DUX.

REFERENCES CITED

The following references are of record in the file of this patent:

UNITED STATES PATENTS

| Number | Name | Date |
|---|---|---|
| 924,411 | Abramowski et al. | June 8, 1909 |
| 1,017,411 | Harris | Feb. 13, 1912 |
| 1,411,479 | Cloud | Apr. 4, 1922 |
| 1,944,265 | Pilorz | Jan. 23, 1934 |
| 2,192,041 | Headland | Feb. 27, 1940 |
| 2,219,026 | Webb et al. | Oct. 22, 1940 |

FOREIGN PATENTS

| Number | Country | Date |
|---|---|---|
| 2,168 | Great Britain | Jan. 26, 1895 |
| 267,301 | Italy | Sept. 2, 1929 |